United States Patent [19]

Rubel

[11] Patent Number: 5,188,441
[45] Date of Patent: Feb. 23, 1993

[54] DIRECTIONAL FASTENER ASSEMBLY

[76] Inventor: Edward R. Rubel, 68 S. Landing Rd., Rochester, N.Y. 14610

[21] Appl. No.: 723,331

[22] Filed: Jun. 28, 1991

[51] Int. Cl.$^5$ .............................................. B62D 55/26
[52] U.S. Cl. .................................. 305/54; 305/35 EB; 411/156; 411/160; 411/544
[58] Field of Search ............... 305/24, 35 R, 35 EB, 305/54, 39; 411/185, 186, 187, 189, 155, 156, 160, 544

[56] References Cited

U.S. PATENT DOCUMENTS

| | | | |
|---|---|---|---|
| 2,096,041 | 10/1937 | Hosking | 411/187 |
| 2,426,974 | 9/1947 | Ragon . | |
| 3,572,851 | 3/1971 | Schuler . | |
| 3,767,275 | 10/1973 | Russ, Sr. . | |
| 3,782,787 | 1/1974 | Rubel et al. | 305/54 X |
| 3,785,420 | 1/1974 | Bradley et al. | 305/54 X |
| 3,838,894 | 10/1974 | Reedy | 305/54 X |
| 3,865,441 | 2/1975 | Jolliffe . | |
| 3,930,689 | 1/1976 | Maki . | |
| 3,973,808 | 8/1976 | Janssen et al. . | |
| 4,059,315 | 11/1977 | Jolliffe et al. . | |
| 4,095,849 | 6/1978 | Husted . | |
| 4,218,101 | 8/1980 | Thompson . | |
| 4,322,193 | 3/1982 | Stahl | 411/544 X |

FOREIGN PATENT DOCUMENTS

| | | | |
|---|---|---|---|
| 0143943 | 9/1980 | Fed. Rep. of Germany | 411/189 |
| 1156224 | 8/1956 | France | 411/155 |

Primary Examiner—Russell D. Stormer
Attorney, Agent, or Firm—Cumpston & Shaw

[57] ABSTRACT

A directional backing plate and threaded nut for securing the traction device relative to a flexible rotatable track. The backing plate and nut define noncircular curvilinear peripheries defined by a major axis and a minor axis, wherein the major axis is greater than the minor axis. The backing plate and threaded nut cooperatively engage the stud relative to the track, such that the major axis is substantially perpendicular to the direction of rotation of the track, and the minor axis is substantially parallel to the direction of rotation.

18 Claims, 3 Drawing Sheets

DIRECTIONAL FASTENER ASSEMBLY

The present invention relates to fasteners, and more particularly to a directional fastener assembly for affixing a traction stud to a flexible rotatable track.

BACKGROUND OF THE INVENTION

Vehicles driven over adverse riding surfaces, such as snow, ice, or mud employ traction devices to improve operating performances. The traction devices include a substantially cylindrical stud having either a conical or wedge shaped bit. The conical bit defines a circular cone having a circular cross section transverse to the direction of penetration into the riding surface. The tip of the cone penetrates the riding surface to improve traction. The wedge shaped bit defines a planar wedge which penetrates the riding surface to improve traction.

The bit is either affixed to the stud or integrally formed with the stud. The stud includes a threaded portion and a peripheral flange defining wrench flats.

A washer and T-nut are used to affix the stud to the track. The washers have either a circular or a square periphery. The washer includes a concentric aperture sized to receive the cylindrical portion of the stud. The portion of the washer adjacent the aperture is convex forming a domed portion defined by a spherical radius of approximately 2 to 3 inches. The T-nut is a planar circular piece having a threaded sleeve projecting from one side. Three prongs extend from the same side. The prongs are equally spaced approximately 120° apart about the periphery. The stud is passed through the washer so that the wrench flats contact the convex side of the washer. The threaded portion of the stud is then disposed through an aperture in the track so that the threaded portion extends towards the inside of the track. The T-nut engages the stud and draws the wrench flats against the washer, thereby drawing the washer against the track, and the prongs of the T-nut into the back side of the track.

Due to the tremendous forces exerted upon the traction device, it is desirable to have the contact area between the washer, T-nut, and the track as large as possible. The large surface area minimizes damage to the track as forces are exerted on the traction device. However, the large contact surface area has specific drawbacks. The edges of the large surface area introduce excessive wear as the track passes over the idler wheels. The flexing of the track over the idler wheels causes the edges of the washer and T-nut gouge the track. Therefore, there are benefits to reducing the contact area. In addition, as the T-nut rotates past the idler wheels, the prongs temporarily disengage the track, and then reengage as the T-nut passes beyond the idler wheel. The repeated withdrawal and insertion of the prongs into the track locally weakens the track.

In an attempt to provide a balance between increased contact area and track wear, transverse cleats have been used across the width of the track. The cleats extend perpendicular to the direction of rotation. A plurality of traction devices may be cooperatively engaged with the track along the width of the track. However, the cleats require a plurality of traction devices, and add significant weight to the track which weight also introduces extra wear.

SUMMARY OF THE INVENTION

The present invention includes a directional fastener assembly having a directional backing plate and directional T-nut for providing increased contact area between the traction device and the track, while minimizing the resistance to rotation and track degradation.

Preferably, the backing plate has an obround configuration and includes a concave surface having a larger radius of curvature than the washers of prior art. The obround configuration is defined by a major axis and a minor perpendicular axis, wherein the major axis is longer than the minor axis.

The backing plate cooperates with the directional T-nut to retain the traction device relative to the track. The T-nut is defined by a non-circular curvilinear periphery, having a major axis and a perpendicular minor axis such that the major axis is greater than the minor axis. The directional backing plate and T-nut cooperate to affix a stud relative to the track, such that the major axis of the T-nut and backing plate are substantially perpendicular to the direction of rotation of the track, and the minor axes are substantially parallel to the direction of rotation.

The fastener assembly provides a reduced length of contact with the track in the direction of rotation, thereby reducing the amount of cutting into the track by the edges of the backing plate and the T-nut. The fastener assembly also provides an increased contact area perpendicular to the direction of rotation, thereby distributing forces over a larger area to reduce wear on the track.

DETAILED DESCRIPTION OF A PREFERRED EMBODIMENT

Figure 1:
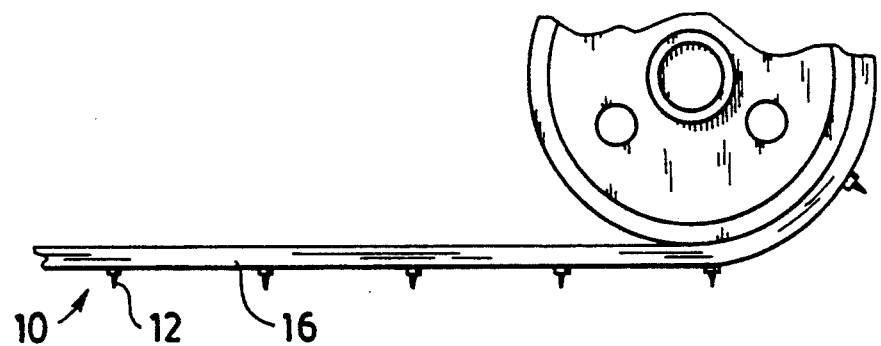
FIG. 1 is a partial side elevational view of the fastener assembly in an operating environment.
Figure 2:
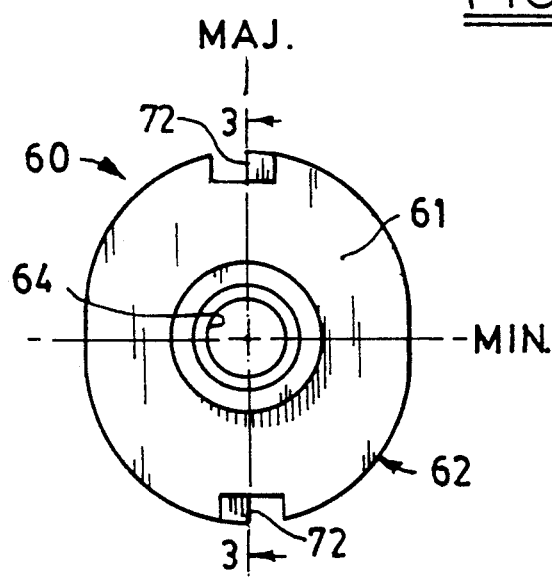
FIG. 2 is a bottom plan view of the directional T-nut showing the obround periphery.
Figure 3:
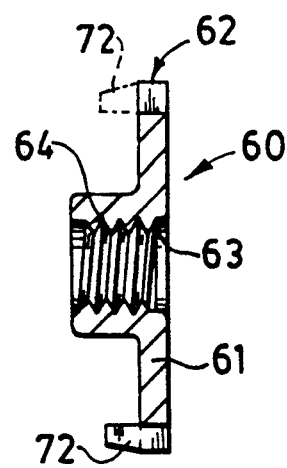
FIG. 3 is a cross-sectional view taken along lines 3—3 of FIG. 2.
Figure 6:
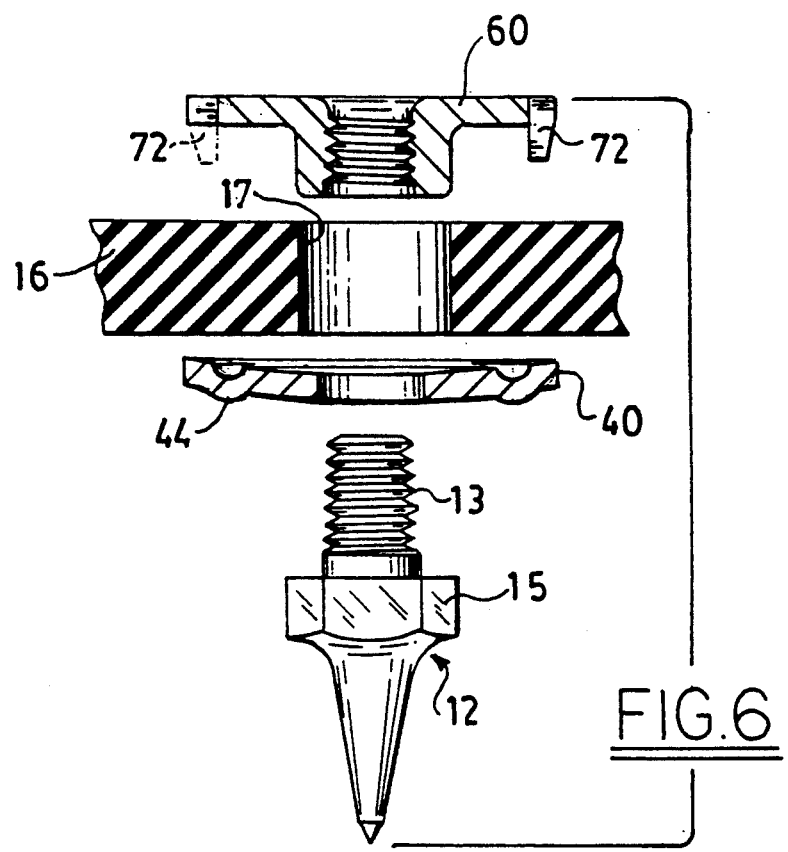
FIG. 6 is an exploded partial cross-sectional view of the directional fastener assembly relative to a flexible track.
Figure 7:
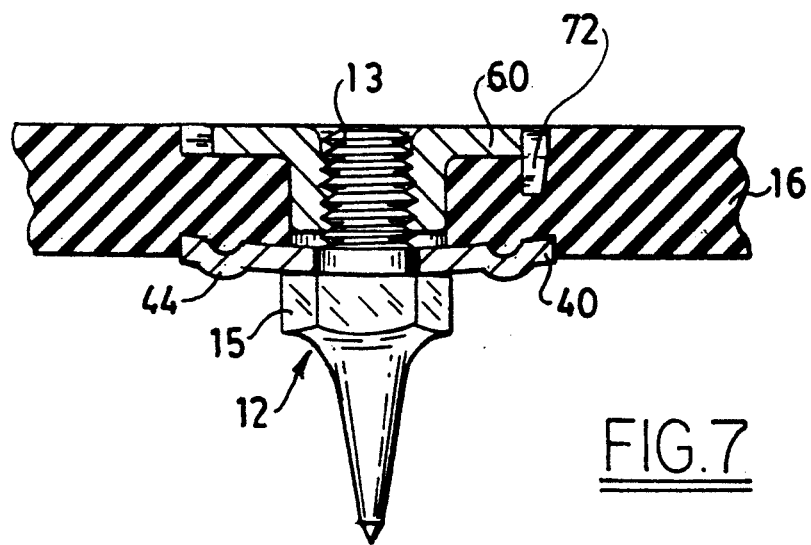
FIG. 7 is a partial cross-sectional view of a directional fastener assembly cooperatively engaging a traction device and a flexible track.
Figure 8:
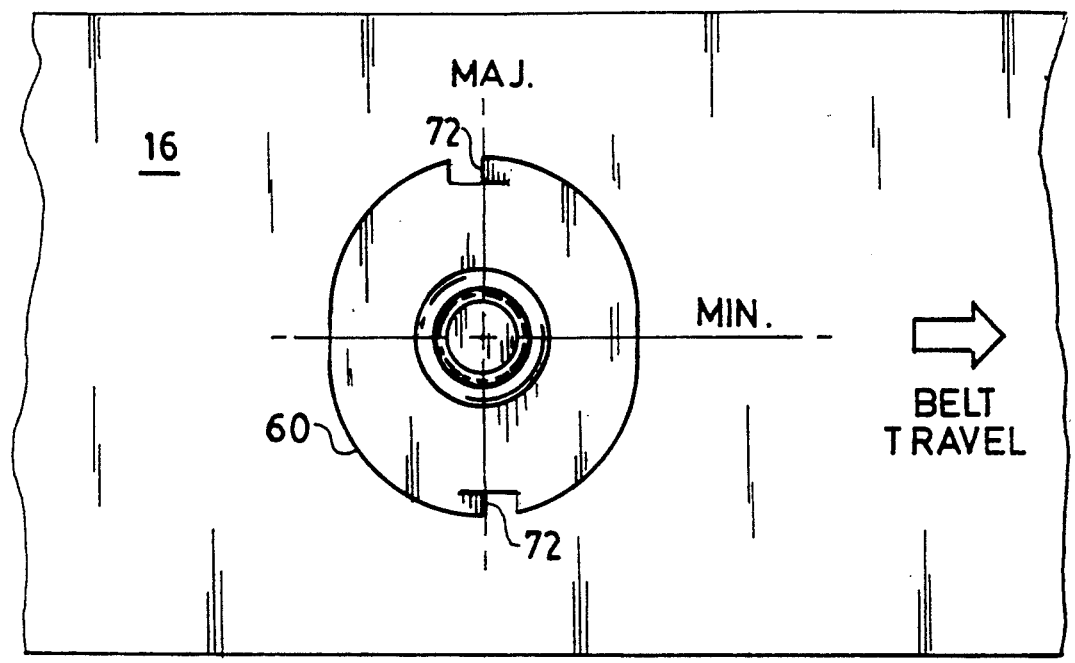
FIG. 8 is a top plan view of a directional fastener assembly for securing a threaded stud to a rotatable flexible track showing the orientation of the major axis and the minor axis of the directional T-nut relative to the direction of belt travel.
Figure 9:
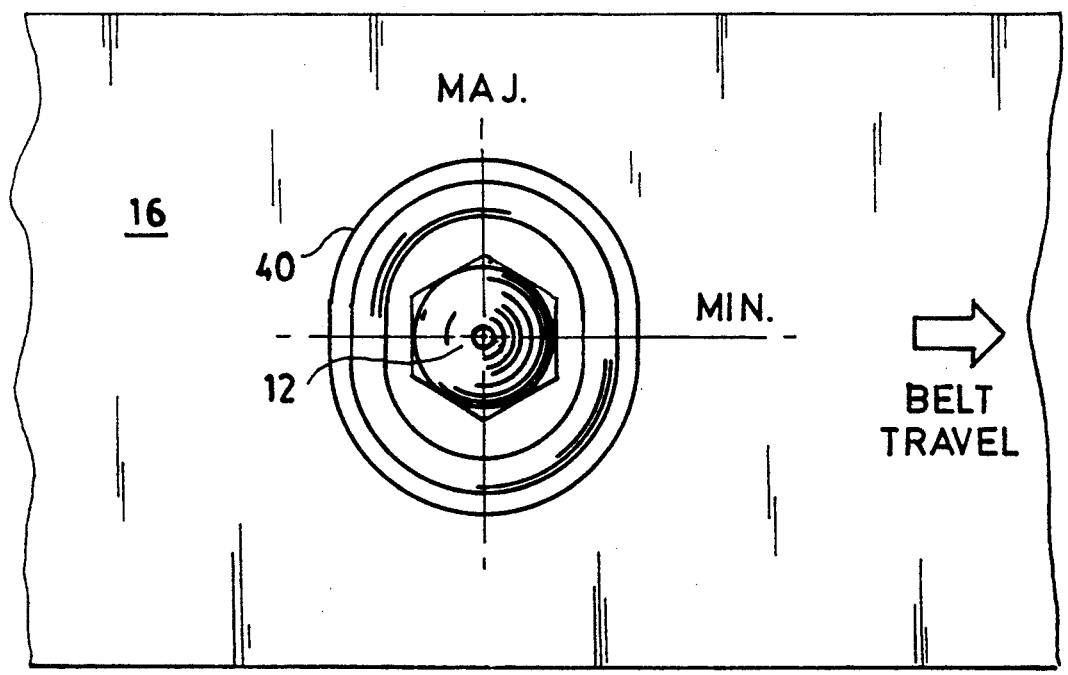
FIG. 9 is a bottom plan view of a directional fastener assembly for securing a threaded stud to a rotatable flexible track showing the major axis and the minor axis of the directional backing plate relative to the direction of belt travel.

Referring to FIG. 1, the directional fastener assembly 10 of the present invention retains a traction stud 12 relative to a rotatably flexible track 16. As shown in FIGS. 6 and 7, the traction stud includes a threaded portion 13 and peripheral wrench flats 15. The fastener assembly 10 includes a directional backing plate 40 and directional T-nut 60.

Figure 4:
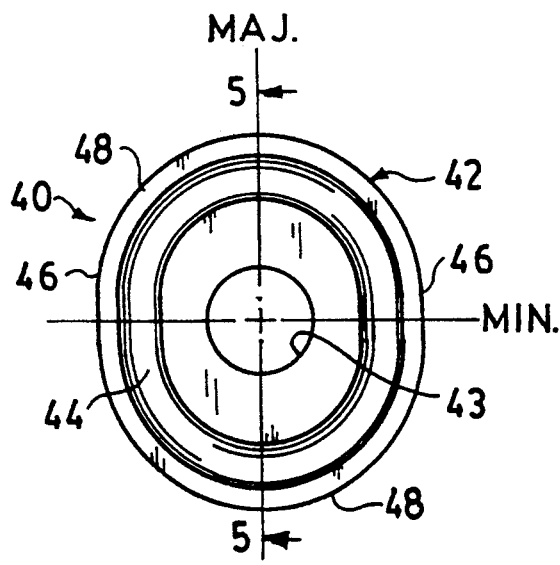
FIG. 4 is a top plan view of the directional backing plate.
Figure 5:
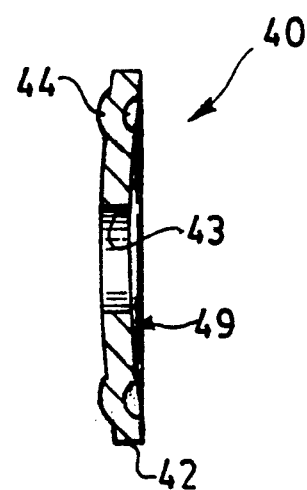
FIG. 5 is a cross-sectional view taken along lines 4—4 of FIG. 5.

Referring to FIGS. 4 and 5, the backing plate 40 is defined by a curvilinear non-circular periphery 42. The periphery 42 may be substantially oval, and is defined by a major axis MAJ and a perpendicular minor axis MIN, wherein the major axis is longer than the minor axis. The backing plate 40 defines an obround periphery 42, that is, having the form of a flattened cylinder having parallel sides 46 and semicircular ends 48. Preferably, the parallel sides 46 extend parallel to the major axis MAJ for a length of 1/16" to ⅛" with a preferred length of approximately ⅛". The parallel sides 46 are connected by the semicircular curved ends 48 having by a radius of approximately ⅛" to ⅜" with a preferred radius of approximately ⅛".

Each of the sides 46 are of equal length, and each of the curved ends 48 are of equal length, such that the sides are interconnected by the curved semicircular ends. Preferably, the parallel sides 46 define approximately 2/25 the periphery of the backing plate 40, wherein the ratio of minor axis MIN to major axis MAJ is from approximately 4:5 to 19:20 with a preferred ratio of approximately 8:9. That is, the minor axis has a length from approximately 80% to approximately 95% of the major axis. The backing plate 40 includes a central aperture 43 having a diameter sufficient to receive the specific traction device employed with the fastener assembly. The diameter of the central aperture 43 may be from approximately ¼" to 5/16" with a preferred diameter of 17/64".

The backing plate 40 includes a circumscribing rib 44 set back from the periphery by approximately 0.06". The rib 44 defines a convex surface having a cross section transverse to the longitudinal dimension of approximately 0.12".

The backing plate 40 defines a concave surface 49 within the area of the rib 44, wherein the surface 49 is defined by a radius of curvature of approximately 4 to 10 inches. The concavity functions to bias the threads of the stud 12 against the threads of the T-nut 60 when cooperatively engaged with the track 16. The increased radius of curvature reduces the amount of dome, or concavity, thereby increasing the effective contact area between the backing plate 40 and the track 16 for the given periphery of the backing plate. The increased effective contact area distributes the clamping pressure over a larger area to minimize damage to the track 16. Preferably, the backing plate 40 is formed of heat treated 1070 spring steel.

Referring to FIGS. 2, 3, 6 and 7, the directional T-nut 60 includes a substantially planar member 61 defined by a non-circular curvilinear periphery 62. The periphery 62 may be substantially oval and specifically obround, defined by a major axis MAJ and a perpendicular minor axis MIN, wherein the major axis is greater than the minor axis. Preferably, the periphery 62 of the T-nut 60 satisfies the same ratio of minor axis MIN to major axis MAJ, as the backing plate 40, and the periphery 62 of the T-nut 60 is substantially coincident with the periphery 42 of the backing plate 40. That is, the periphery 62 of the T-nut 60 exhibits the same dimensions as the periphery 42 of the backing plate 40. However, the periphery of the T-nut may be less than or greater than the periphery of the backing plate, while having the same axes ratios.

The T-nut 60 includes a central aperture 63 sized to receive the cylindrical portion of the stud 12. The T-nut 60 includes a threaded sleeve 64 extending from the planar surface 61, concentric with the central aperture 63. The threaded sleeve 64 cooperatively engages the threaded portion of the stud 12. The outer diameter of the sleeve 64 is sized to be disposed within an aperture in the track.

A pair of depending prongs 72 extend from the planar surface 61 of the T-nut 60 in the same direction as the sleeve 64. The prongs 72 engage the track 16 to prevent rotation of the T-nut 60 relative to the track. Preferably, the prongs 72 are located at opposite ends of the major axis MAJ. As the prongs 72 will be colinearly aligned perpendicular to the axis of rotation, the prongs are not forced to withdraw and reinsert into the track 16 each time the assembly passes the idler wheel.

Alternatively, the periphery of the backing plate to and T-nut 60 may comprise a plurality of linear segments (not shown) which define a non-circular substantially oval periphery wherein the dimension perpendicular to the direction of rotation is larger than the dimension parallel to the direction of rotation.

To employ the fastener assembly 10, an aperture 17 is formed in the track 16 in the desired location of the traction stud 12. The stud 12 is then disposed through the backing plate 40, such that the convex surface corresponding to the concave surface 49 of the backing plate contacts the peripheral flange formed by the wrench flats 15 on the stud. The backing plate 40 and stud 12 are then disposed relative to the track 16, such that the threaded portion 13 of the stud extends into the aperture 17. The concave surface 49 contacts the track 16.

The backing plate 40 is aligned so that the major axis MAJ is substantially perpendicular to the direction of rotation of the track 16 and the minor axis MIN is substantially parallel to the direction of rotation. That is, the parallel sides 46 of the backing plate 40 are perpendicular to the direction of rotation of the track.

The threaded sleeve 64 of the T-nut 60 engages the threaded portion 13 of the stud 12. The T-nut 60 is pressed into the track 16 so that the prongs 72 engage the track, and the major axis MAJ is perpendicular to the direction of rotation and the minor axis MIN is parallel to the direction of rotation. The stud 12 is threaded into the T-nut 60, until the backing plate 40 and the T-nut 60 are substantially coplanar with the respective surfaces of the track.

The dimension of the contact area perpendicular to the direction of rotation distributes the clamping force over a relatively large area, and the lesser dimension of the area of contact parallel to the direction of rotation reduces wear induced by flexing or rotation of the track 16.

Preferably, the dimensison of the contact area parallel to the axis of rotation corresponds to the diameter of the idler wheel so that upon rotation of the directional fastener assembly over the idler or drive wheel, the ends of the contact area parallel to the direction of rotation do not degrade the track. The dimension of contact between the fastener assembly and the track 16 perpendicular to the direction of rotation is greater than dimension of contact parallel to the direction of rotation.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A directional fastener assembly for securing a threaded stud to a rotatable flexible track, comprising:
   (a) a directional backing plate having a non-circular periphery defined by a major axis for alignment perpendicular to the direction of rotation of the track and a perpendicular minor axis for alignment parallel to the direction of rotation of the track, wherein the minor axis is shorter than the major axis, the backing plate including an aperture sized to receive a portion of the stud;
   (b) a directional threaded T-nut having a non-circular periphery defined by a major axis and a perpendicular minor axis, wherein the minor axis is shorter than the major axis, the nut including a threaded aperture sized to cooperatively engage a portion of the threaded stud such that upon securing the stud to the track, the track is between the backing plate and the nut;
   (c) engaging means for engaging the directional threaded T-nut with the track, the engaging means including a pair of prongs depending from the directional threaded T-nut and substantially aligned colinear with the major axis.

2. The directional fastener assembly of claim 1, wherein the periphery of the directional backing plate is obround and the periphery of the directional T-nut is obround.

3. The directional fastener assembly of claim 1, wherein the periphery of the directional backing plate is substantially equal to the periphery of the directional T-nut.

4. The directional fastener assembly of claim 1, wherein the periphery of the directional backing plate and directional T-nut is defined by a pair of substantially parallel sides interconnected by arcuate ends.

5. The directional fastener assembly of claim 1, wherein the directional backing plate includes a substantially peripheral rib.

6. The directional fastener assembly of claim 1, wherein the ratio of the length of the minor axis to the length of the major axis is from approximately 4:5 to 19:20.

7. The directional fastener assembly of claim 1, wherein the directional backing plate includes a concave surface defined by a spherical radius between approximately 4" and 10".

8. The directional fastener assembly of claim 1, wherein the directional T-nut includes a pair of depending prongs disposed at opposing ends of the major axis.

9. A directional fastener assembly for securing a traction device to a rotatable flexible track having a given direction of rotation, an inner surface and an outer surface, the fastener assembly comprising:
   (a) a directional backing plate having a contact surface for contacting the outer surface of the track, such that upon operable engagement of the backing plate and the outer surface of the track, the length of contact between the contact surface and the outer surface of the track in a direction perpendicular to the direction of rotation is greater than the length of contact in the direction parallel to the direction of rotation; and
   (b) a directional T-nut for cooperatively engaging the traction device and for contacting the inner surface of the track such that the track is disposed between the backing plate and the nut upon securing the traction device to the track, and the length of contact between the T-nut and the track in a direction perpendicular to the direction of rotation is greater than the length of contact in the direction parallel to the direction of rotation;
   (c) engaging means for engaging the directional threaded T-nut with the track, the engaging means including a pair of prongs depending from the directional threaded T-nut and substantially aligned colinear with the major axis.

10. The directional fastener assembly of claim 9, wherein the periphery of the directional backing plate is obround and the periphery of the directional T-nut is obround.

11. The directional fastener assembly of claim 9, wherein the periphery of the directional backing plate is substantially equal to the periphery of the directional T-nut.

12. The directional fastener assembly of claim 9, wherein the periphery of the directional backing plate and directional T-nut is defined by a pair of substantially parallel sides interconnected by arcuate ends.

13. The directional fastener assembly of claim 9, wherein the directional backing plate includes a substantially peripheral rib.

14. The directional fastener assembly of claim 9, wherein the ratio of the length of the minor axis to the length of the major axis is between approximately 4:5 and 19:20.

15. The directional fastener assembly of claim 9, wherein the directional backing plate includes a concave surface defined by a spherical radius of approximately 4–10".

16. The directional fastener assembly of claim 9, wherein the directional T-nut includes a pair of depending prongs disposed at opposing ends of the major axis.

17. A method for securing a threaded stud relative to a rotatable, flexible track having a given thickness, the method comprising:
   (a) passing a portion of the threaded stud through a directional back plate and through the thickness of the track, the directional backing plate having a non-circular periphery defined by a major axis and a perpendicular minor axis; wherein the minor axis is shorter than the major axis;
   (b) aligning the major axis of the back plate substantially perpendicular to the direction of rotation to the track;
   (c) engaging a threaded directional T-nut with the stud extending through the thickness of the track, the directional T-nut having non-circular periphery defined by a major axis and a perpendicular minor axis, wherein the minor axis is shorter than the major axis; and
   (d) aligning the major axis of the directional T-nut substantially perpendicular to the direction of rotation of the track.

18. A fastener assembly for securing a stud to a rotating flexible track comprising first and second oval plates adapted to engage a portion of the track therebetween, one of the oval plates including means for securing the stud to the oval plate, wherein the plates are aligned on the track with a first dimension in the direction of rotation of the track and a second, longer dimension perpendicular to the direction of rotation of the track for reducing stress on the track as the track rotates.

* * * * *